(12) United States Patent
Geelhaar et al.

(10) Patent No.: US 7,136,284 B2
(45) Date of Patent: Nov. 14, 2006

(54) ELECTRICAL APPLIANCE TO BE MOUNTED ON A RETAINER

(75) Inventors: Bernd Geelhaar, Hildesheim (DE); Peter Knochenhauer, Hildesheim (DE)

(73) Assignee: Robert Bosch GmbH, Stuttgart (DE)

( * ) Notice: Subject to any disclaimer, the term of this patent is extended or adjusted under 35 U.S.C. 154(b) by 181 days.

(21) Appl. No.: 10/500,641

(22) PCT Filed: Oct. 30, 2002

(86) PCT No.: PCT/DE02/04040

§ 371 (c)(1), (2), (4) Date: Jul. 1, 2004

(87) PCT Pub. No.: WO03/059693

PCT Pub. Date: Jul. 24, 2003

(65) Prior Publication Data
US 2005/0077070 A1 Apr. 14, 2005

(30) Foreign Application Priority Data
Jan. 18, 2002 (DE) ................. 102 02 034

(51) Int. Cl.
*G06F 1/20* (2006.01)
(52) U.S. Cl. .................................... 361/687
(58) Field of Classification Search ............ 361/681, 361/687
See application file for complete search history.

(56) References Cited

U.S. PATENT DOCUMENTS

| | | | |
|---|---|---|---|
| 3,134,945 A | | 5/1964 | Wertheimer |
| 4,180,299 A | * | 12/1979 | Tolerson ................ 312/242 |
| 4,627,589 A | * | 12/1986 | Hotsumi ............... 248/346.03 |
| 5,288,049 A | | 2/1994 | Hays |
| 5,832,082 A | * | 11/1998 | Nagai ..................... 379/449 |
| 6,810,238 B1 | * | 10/2004 | Deeds et al. ............ 455/90.1 |
| 2001/0012359 A1 | | 8/2001 | Gester et al. |

FOREIGN PATENT DOCUMENTS

| | | |
|---|---|---|
| DE | 25 58 950 A | 7/1976 |
| EP | 0 960 781 A | 12/1999 |
| FR | 1 577 298 A | 8/1969 |
| WO | 00 38951 A | 7/2000 |

* cited by examiner

*Primary Examiner*—Yean-Hsi Chang
(74) *Attorney, Agent, or Firm*—Michael J. Striker

(57) ABSTRACT

The invention proposes an electrical device for attachment to a holder, particularly in a vehicle, wherein the electrical device is attached on the one side by means of a hook connector and on the other side by means of a detent mechanism, preferably a pivoting ratchet. The detent mechanism can be secured by means of a lock so as to prevent unauthorized removal of the electrical device, which is preferably a display unit.

29 Claims, 4 Drawing Sheets

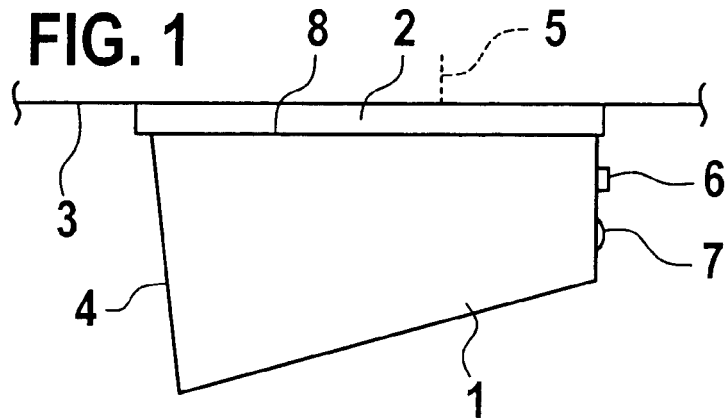
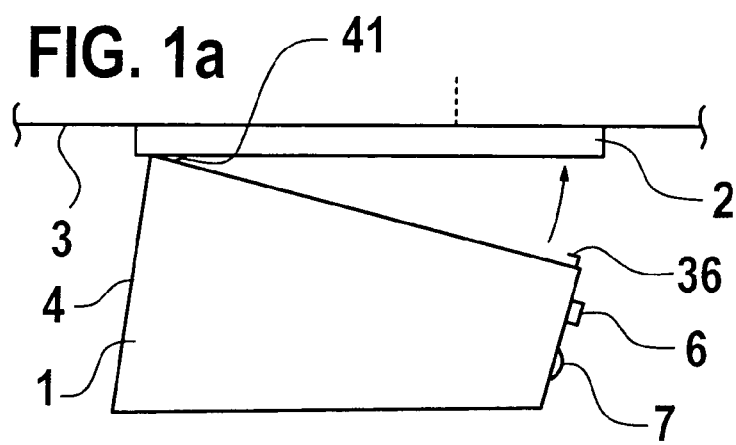
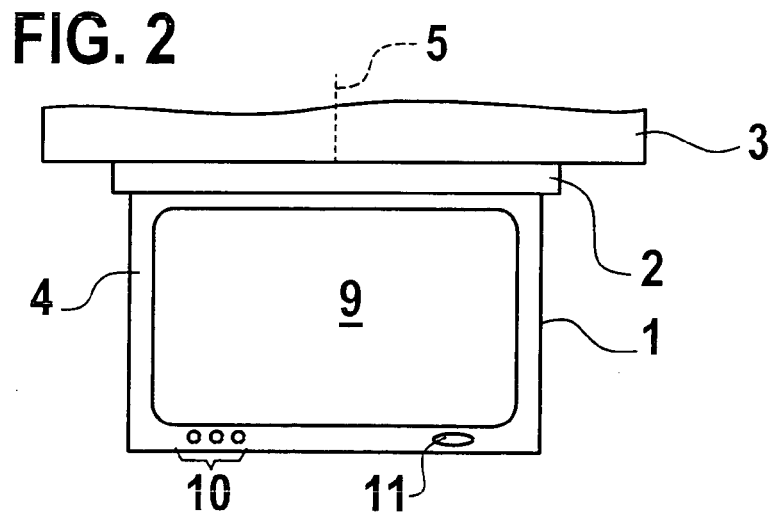

ELECTRICAL APPLIANCE TO BE MOUNTED ON A RETAINER

CROSS-REFERENCE

The invention described and claimed hereinbelow is also described in PCT/DE02/04040, filed on Oct. 30, 2002 and DE 102 02 034.5, filed Jan. 18, 2002. This German Patent Application, whose subject matter is incorporated here by reference, provides the basis for a claim of priority of invention under 35 U.S.C. 119 (a)–(d).

BACKGROUND OF THE INVENTION

The invention is based on an electrical device for attachment to a holder. A holder, in particular for a monitor in a vehicle, is already known from U.S. Pat. No. 5,288,049. In it, an electrical device in the form of a monitor is slid into a clamp mounted to a vehicle roof and after being slid into place, is secured by means of a lock. When the monitor is being mounted, it must be moved along the clamp along the entire sliding path, i.e. in accordance with its length. In addition, when the monitor is being mounted, the monitor, which is above the head of the installer, must be inserted into the clamp provided for the holder in a precisely fitting manner.

SUMMARY OF THE INVENTION

The electrical device according to the invention, has the advantage over the prior art that it is easy to attach to a holder provided to accommodate it. To this end, the electrical device is first attached to the holder by means of at least one hook. Then the electrical device is pivoted on the hook in relation to the holder so that the device locks into a second connection with the holder. A sliding motion, which can also involve wear and contamination in the form of shavings, can therefore be avoided, thus facilitating installation and extending the service life beyond that of a rail support. In addition, an installer can see the hooks while inserting the electrical device, thus further facilitating insertion. The installation space required for mounting the electrical device is also reduced since the electrical device can be placed directly against the holder, without having to provide additional installation space in the vicinity of the holder to allow for a sliding movement.

It is particularly advantageous if the hook for the first connection is provided on the electrical device and a receptacle for the hook is provided on the holder. This prevents hooks from protruding out from the receptacle, thus avoiding the risk of accidents presented by hooks protruding from the holder after the electrical device is removed from the holder.

It is also advantageous if the receptacle for the hook is provided with a pin that engages in a suitable hole provided in the hook in order to accommodate the pin. This secures the electrical device in relation to the holder, even if the second connection, i.e. the locking mechanism, has already been released. This prevents the electrical device from suddenly pivoting in relation to the holder.

It is also advantageous to attach a top of the electrical device to an underside of the holder since this permits a suspended installation for the electrical device, which on the one hand, permits an elevated installation position and on the other hand, leaves the bottom surface available for other uses.

In particular, a locking mechanism can be advantageously achieved by means of a pivoting catch that engages with an edge of the holder. This provides a secure hold of the electrical device in relation to the holder since the hooks engage the holder from a first side and the catch engages the holder from the opposite side. The locking advantageously occurs automatically as soon as the electrical device, which is already attached to the holder by means of the first connection, comes to rest against a support surface of the holder.

It is also advantageous for the locking mechanism to be designed particularly in the form of a lockable pivoting ratchet since on the one hand, this prevents a removal of the electrical device from the holder when it is in the locked position and on the other hand, engages with the holder, preferably in an automatic fashion, when the electrical device is inserted into the holder.

It is also advantageous for the electrical device to be embodied with a housing containing an electrical component, wherein the hook and the detent mechanism are provided on the housing. This makes it possible to replace the electrical component inside the housing, thus rendering it unnecessary to also replace the holder device when replacing the electrical component.

It is also advantageous to cover at least part of the housing of the electrical device with a protective layer made of plastic, which is preferably comprised of a soft, foamed, and therefore shock-absorbing material. On the one hand, this can prevent injury to users due to collisions with the electrical device and on the other hand, the electrical device is protected from damage and possibly from corrosion.

It is also advantageous to provide a plug connection on a side of the electrical device oriented toward the holder. After installation of one of the electrical devices, the plug connection is preferably no longer accessible without releasing the locking mechanism, thus assuring that the electrical device is electrically connected to a supply voltage and/or protecting a data source from being touched.

It is particularly advantageous to embody the electrical device as a display unit since the attachment to the holder permits a secure support, e.g. even in a vehicle. In particular, the display units, which are often embodied as expensive components, can be protected from unauthorized removal. In addition, display units often need to be mounted in elevated positions; in this particular regard, the invention permits a display unit to be suspended underneath a support.

It is particularly advantageous to provide a holder for mounting an electrical device to the underside of a vehicle roof, a luggage rack, or a ventilation conduit inside a vehicle, since providing information to the driver or passengers requires expensive devices, which on the one hand, have to be mounted in exposed positions, and on the other hand, must be protected from unauthorized removal and protected from damage while driving.

BRIEF DESCRIPTION OF THE DRAWINGS

Exemplary embodiments of the invention are shown in the drawings and will be explained in detail in the description that follows.

FIG. 1 is a side view of an electrical device according to the invention, in the form of a display unit, on a holder, FIG. 1a shows an electrical device that is suspended in the holder only in a first connection, before it is locked into the second connection, FIG. 2 is a front view of the electrical device according to FIG. 1.

DESCRIPTION OF THE PREFERRED EMBODIMENT

Figure 3:
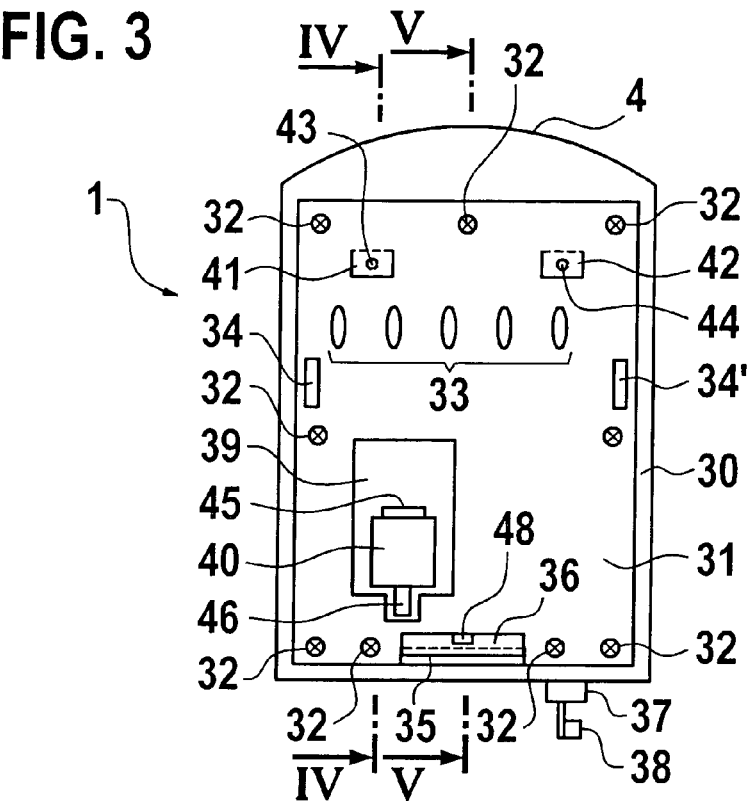
FIG. 3 is a view of a top of the electrical device.

Any electrical device can be used as the electrical device according to the invention. An installation of an electrical device according to the invention is particularly advantageous if it is necessary for it to be mounted to the underside of a supporting structure, i.e. a suspended installation. This is the case, for example, with kitchen appliances, computer cases, radios, televisions, or monitors. The installation on a holder according to the invention permits not only a simple installation, but also facilitates replacement, e.g. in the event of a defect or required maintenance. In particular, it is also possible to remove the electrical device as needed. The description below will explain an electrical device and holder according to the invention in conjunction with the example of an installation of a monitor in a vehicle. The type of vehicle is arbitrary, e.g. an aircraft, a boat, or a motor vehicle. In particular, though, the installation of a monitor is advantageous in a vehicle that carries a large number of passengers, e.g. a tour bus, wherein the intent is to provide a large number of passengers with as large a screen as possible, which offers the large number of passengers a quality image but which, due to its large size, is also heavy and therefore difficult to install.

As an example of an electrical device, FIG. 1 shows a monitor 1 that is mounted to a holder 2. The holder 2 in turn is attached to a support 3 so that the support 3 also supports the monitor 1 by means of the holder 2. A front side 4 has a display that is not shown in FIG. 1; the monitor 1 also contains an image-generating unit that is likewise not shown. A power and/or data supply line 5 depicted with dashed lines is routed into the monitor 1 from the support 3. The attachment of the monitor 1 to the holder 2 is secured by means of a lock 6. When the lock is open, the monitor 1 can be removed from the holder 2 by pressing on the pressure surface 7. In a support surface 8, a top of the monitor 1 rests against an underside of the holder 2 oriented away from the support 3. In other exemplary embodiments, it is also possible for the support 3 and the holder 2 extending parallel to it to be vertically mounted. The monitor can display television images, video images, and/or text and graphical data.

FIG. 2 is a front view of the monitor 1. The front side 4 of the monitor 1 accommodates a display surface 9 of a display unit. In a first exemplary embodiment, this display surface 9 is the display surface of a cathode ray tube. However, any other type of display is also possible, e.g. a plasma screen or a liquid crystal cell. In another exemplary embodiment, the front side 4 is provided with control elements 10 for controlling the display and/or an air interface 11 to receive signals from a remote control unit, not shown in FIG. 2, that is used to control the display. Except for the region of the display surface 9, the control elements 10, the air interface 11, and the top of the monitor 1 oriented toward the holder 2, an outer wall of the monitor is covered with a protective layer made of a plastic material, e.g. a silicon layer or, in a preferred exemplary embodiment, a soft polyurethane foam layer. The soft foam layer is preferably approx. 10 mm thick. On the one hand, this protects the monitor 1 from damage and on the other hand, protects the passengers of the vehicle in the event of a collision with the monitor 1. For example, the support 3 adjoins the underside of a luggage rack and constitutes a bottom plate of the luggage rack, thus permitting the monitor 1 to be mounted under the luggage rack. The support 3 can also be a vehicle roof or a wall of a ventilation conduit, permitting an air flow to be directed at the side of the support 3 oriented away from the holder 2. Preferably the power and/or data supply lines 5 can be routed to the monitor 1 through the inside of the support 3.

FIG. 3 is a view of a top of the monitor 1. In FIGS. 1 and 2, the top depicted in FIG. 3 is oriented toward the side of the holder 2 facing away from the support 3. A cover plate 31 is fitted into a frame 30 that represents a boundary at the edges of the cover plate 31 and a housing of the monitor 1. The cover plate 31 is attached to the frame 30 by means of screws 32. It is also possible to use other connections instead of the screws 32, for example riveted connections or detent connections. In a region oriented toward the front side 4, a first hook 41 and a second hook 42 protrude from the cover plate 31 and engage in openings provided for them in the holder 2 when the monitor 1 is placed against the holder 2. A first hole 43 is provided in the first hook 41 and a second hole 44 is provided in the second hook 42. The holes 43, 44 are provided to accommodate pins, which are formed onto the holder 2 and serve to secure the monitor 1 in relation to the holder 2. It is also possible for only one hook or for a number of hooks to be formed onto the cover plate 31.

In addition, ventilation slots 33 are provided in the cover plate 31. In another exemplary embodiment, tabs 34, 34' are also bent out from the cover plate 31 in the direction of the holder 2 and corresponding openings are provided in the holder 2 to accommodate these tabs 34, 34'. As a result, the monitor 1 is also secured laterally in relation to the holder 2 in this embodiment.

The hooks 41, 42, together with the associated receptacles in the holder 2, represent a first connection between the monitor 1 and the holder 2. The second connection is produced by a pivoting ratchet 35, which is disposed on an edge of the cover plate 31 oriented away from the front side 4, which cover plate 31 is fitted into the frame 30. A catch 36 of the pivoting ratchet extends above the cover plate 31 while the pivoting ratchet 35 is supported inside the monitor 1 on the side of the cover plate 31 oriented away from the holder 2. When inserted into the holder 2, the catch 36 engages an edge provided for it on the holder 2 and secures it against the cover plate 31. The pivoting ratchet 35 is held in a neutral position by means of a spring that is not shown in FIG. 3. It can also be moved out of the neutral position by means of a mechanism not shown in FIG. 3. In this case, a lock 37 can secure and release the pivoting ratchet 35 when a suitable key 38 is turned. In a preferred embodiment, the key 38 can only be removed when the lock 37 is in the locked position.

On its side oriented toward the holder 2, the catch 36 has a leaf spring 48 formed onto it, which serves to bend the pivoting ratchet 35 back in relation to a urn spring when the monitor 1 is being inserted so that once the catch 36 passes beyond an edge of the holder 2, it can automatically engage behind the edge due to the force of the return spring. In order to provide a supply voltage to the monitor 1, a plug 40 with a connecting region 45 is mounted in a hollow 39 of the cover plate 31. A cable 46 leads to operating electronics of the monitor 1, which are not shown in the drawing.

In an exemplary embodiment not shown in the drawings, the display unit can also be inserted into a housing constituted by the frame 30 so that the display unit can be removed from the frame 30, for example by unscrewing the cover plate 31. This makes it possible to replace the display unit without having to also replace the mechanical components for the holder.

Figure 4:
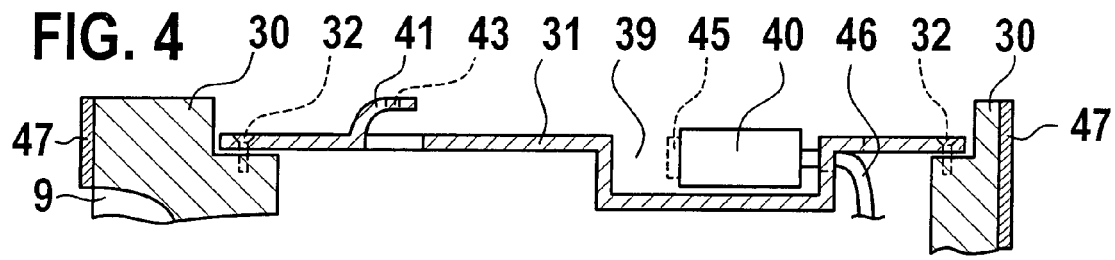
FIG. 4 is a first longitudinal section through the top of the electrical device.
Figure 5:
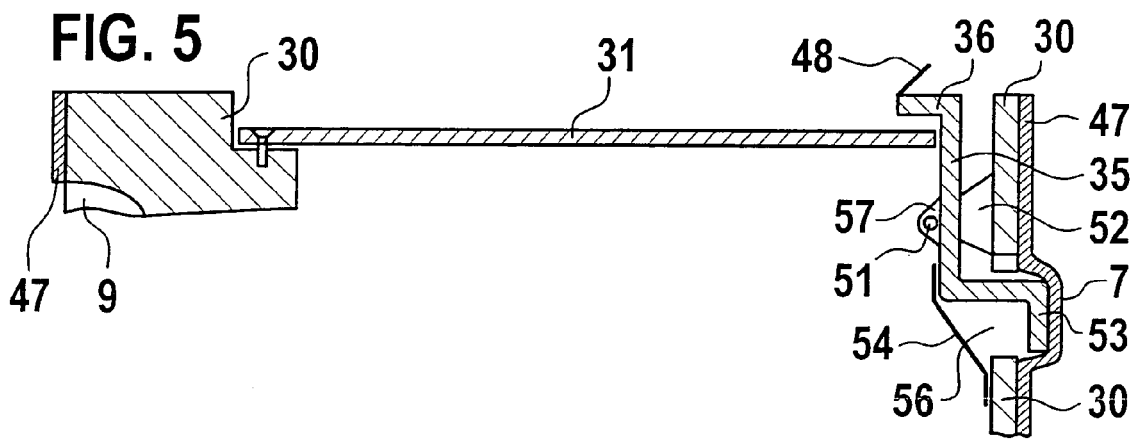
FIG. 5 is another longitudinal section through the top of the electrical device.

FIGS. 4 and 5 show sectional views along the lines IV and V in FIG. 3. Here and below, elements that are the same are labeled with the same reference numerals. As a complement to the depiction in FIG. 3, FIG. 4 shows a protective layer 47 made of a soft foam material, which is attached to the outsides of the frame 30 of the monitor 1. The cover plate 31 is embodied as a plate; the material thickness is selected so that a simple engagement of the hooks 41, 42 in receptacles provided for them allows the monitor to be easily secured by the hooks 41, 42, without allowing the hooks to bend. During manufacture, the hooks 41, 42 are preferably cut out from the cover plate 31 by a stamping process and are then bent out from it. The hollow 39 is correspondingly also formed out of the cover plate 31 by means of a stamping process and a subsequent shaping process.

In another exemplary embodiment not shown in the drawings, the cover plate 31 can also be embodied of one piece with the frame 30. The plug 40 and the connecting region 45 are preferably embodied so that they shield against electromagnetic radiation, on the one hand, allowing data to be transmitted without interference and on the other hand, preventing this transmission from negatively affecting other electrical systems. The same is true for the cable 46. If necessary, e.g. for electromagnetic shielding reasons, it would also be possible to provide a number of plugs in the hollow 39.

FIG. 5 is a side view of the design of the pivoting ratchet 35, whose catch 36 engages with an edge of the holder 2 and secures it against the cover plate 31. The pivoting ratchet 35 is supported in a moving fashion on a rotation axle 51; a contact region 52 in the form of an extension of the frame 30 holds the rotation axle 51 parallel to the back of the monitor 1 on which the lock 37 is provided. In the region of the pressure surface 7, the protective layer 47 also extends over a lever 53 with which the pivoting ratchet 35 can be moved in opposition to the spring force of a return spring 54. When the lever 53 is pressed and the pivoting ratchet 35 is pivoted, the catch 36 releases the edge of the holder 2. The lever 53 is guided through an opening 56 of the frame 30, thus permitting pressure to be exerted on the lever 53 through the protective layer 47, which permits the lever 53 to be pivoted. In a first exemplary embodiment, the protective layer 47 extends flat over the opening 56. A marking is provided on the protective layer 47 to indicate the presence of the pressure surface for actuating the lever 53. In another embodiment, the protective layer 47 over the opening 56 can also be raised up in relation to the surrounding region. The return spring 54 is fastened to the frame 30 on the side of the opening 56 oriented away from the cover plate 31. After the lever 53 is released, the spring force of the return spring 54 moves the pivoting ratchet back into its starting position. If the edge is released, then the monitor 1 can be pivoted on the hooks 41, 42 so that the edge 50 moves past the catch 36. Then the monitor, which is now attached to the holder 2 only in the first connection by means of the hooks 41, 42, can be removed from the holder 2 by guiding the hooks 41, 42 out of receptacles in the holder 2. The installation occurs in the reverse sequence in that the hooks 41, 42 of the monitor 1 are inserted into the holder 2 and then the monitor 1 is pivoted with the catch 36 toward the holder 2 until the leaf spring 48 reaches the edge, wherein the leaf spring 48 causes the edge to press the catch 36 back so that after sliding past the edge of the holder, the catch 36 can engage behind this edge. As a result, the electrical device, which is embodied as a monitor 1 in this instance, is locked to the holder 2 by means of the second connection comprised of the catch 36 and the edge 50. The monitor 1 here is supported both by the hooks in the first connection, which have been inserted into their receptacles on the holder, and by the second connection of the holder 2.

Figure 6:
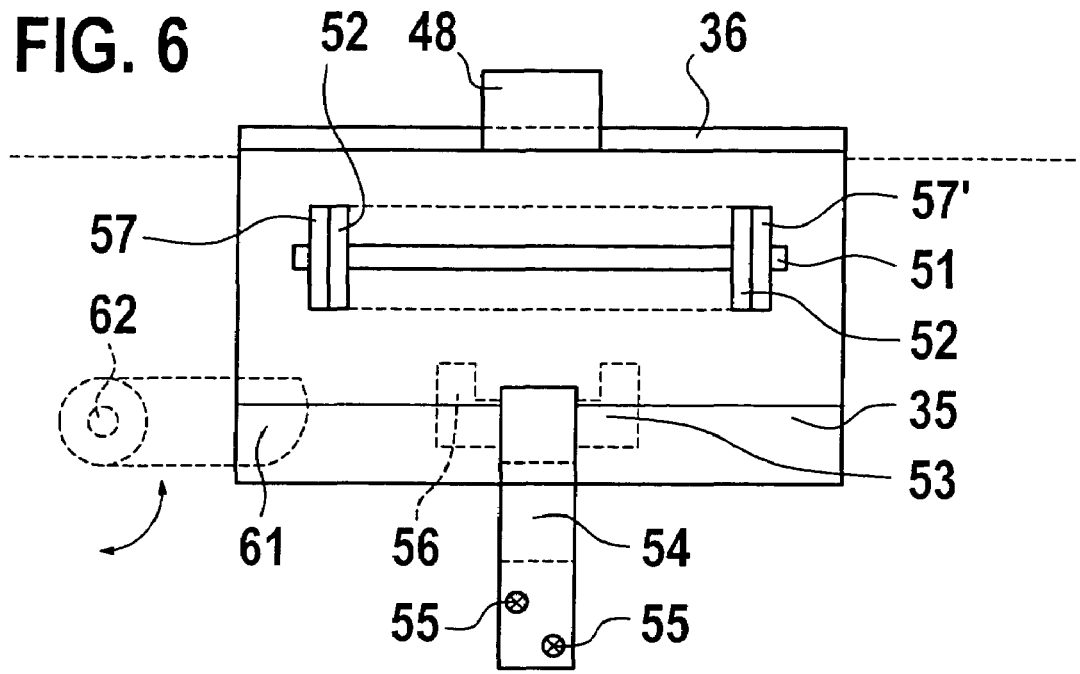
FIG. 6 is a detail view of a pivoting ratchet.

FIG. 6 shows the pivoting ratchet in detail. The leaf spring 48 is fastened to the catch 36. The return spring 54 is preferably attached to the frame 30 by means of screws 55. An extension 57, 57' of the pivoting ratchet 35 at the two ends of the rotation axle 51 contacts the contact regions 52 of the frame 30. The rotation axle 51 extends through bore openings in the contact regions 52 and through bore openings in the extensions 57, 57'. The pivoting ratchet 35 can be prevented from moving in relation to the return spring by means of a securing catch 61 depicted with dashed lines, which the lock 37 can pivot onto a side of the pivoting ratchet 35 oriented away from the frame 30. This secures the catch 36 in a position in which it holds the edge 50 of the holder 2. The securing catch 61 can be pivoted on an axle 62 in the direction of the arrows, the axle 62 being connected to the closing cylinder of the lock 37. As a result, the monitor 1 cannot be removed from the holder 2 without the actuation of the lock 37 when the securing catch 61 is in the position behind the pivoting ratchet, as shown in FIG. 6.

Figure 7:
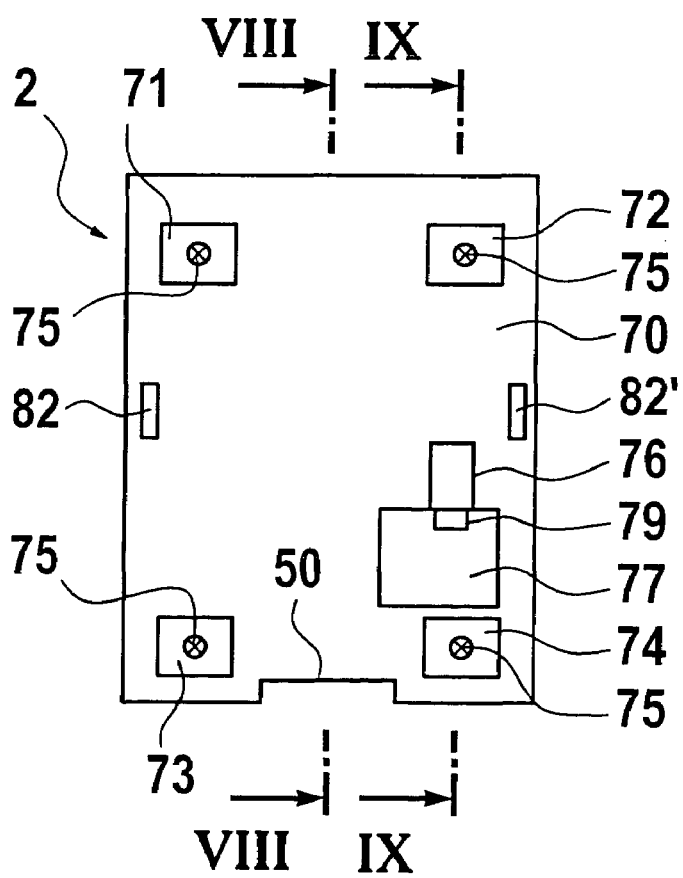
FIG. 7 is a bottom view of a holder according to the invention.

FIG. 7 is a bottom view of the holder 2, i.e. viewed from the position of the monitor 1 in FIG. 1. A plate 70 has a first recess 71, a second recess 72, a third recess 73, and a fourth recess 74 formed into it. The recesses accommodate respective screws 75, which fasten the holder 2 to the support 3. The recesses 71, 72, 73, 74 are preferably formed out of the plate 70 of the holder 2 by means of a stamping process and a subsequent shaping process. The first recess 71 and the second recess 72 simultaneously constitute the receptacles for the first hook 41 and the second hook 42, the first hook 41 being inserted into the second recess 72 and the second hook 42 being inserted into the first recess 71. On the lateral edge of the plate 70 oriented away from the first recess 71 and the second recess 72, an indentation is provided, which constitutes an edge 50 to accommodate the catch 36. The plate 70 is also provided with a mating connector 76 and a hollow 77 that accommodates the plug 40. Optionally, the plate 70 is provided with slots 82, 82', which serve to accommodate the protruding tabs 34, 34' of the cover plate 31.

The monitor 1 is then mounted by inserting the hooks 41, 42 into the recesses 71, 72. A simplified view of this state is depicted in FIG. 1a. Then, the plug 40 is connected to the mating connector 76. To this end, the cable 46 is embodied as flexible so that it can be pulled a certain distance out from the monitor 1. Then the monitor 1 is pivoted toward the holder 2 in the direction of the arrow. If the catch 36 reaches the holder 2, then it automatically engages with the edge 50, as explained above in conjunction with FIG. 6. In the process of this, the cable 46 slides back into the housing of the monitor 1. The mating connector 76 has a plug region 79 that preferably ends flush with the connecting region 45 of the plug 40.

Figure 8:
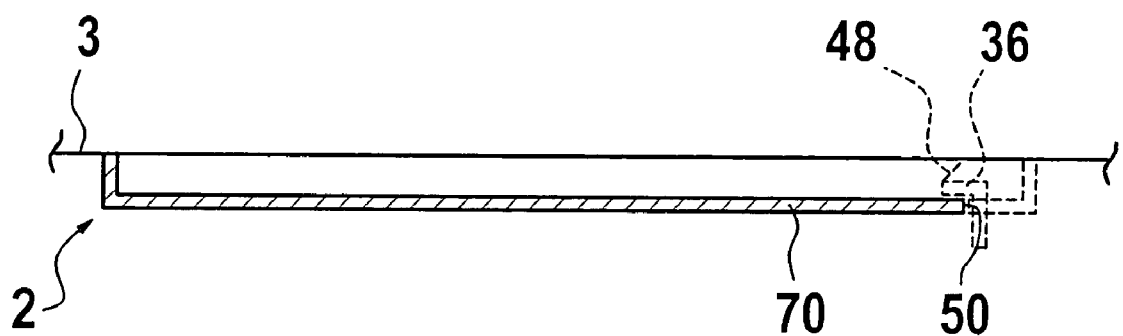
FIG. 8 is a first longitudinal section through a holder according to the invention.
Figure 9:
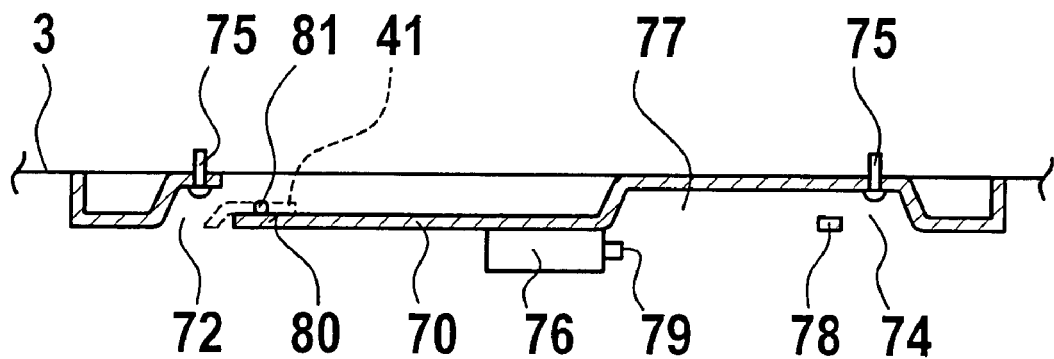
FIG. 9 is a second longitudinal section through a holder according to the invention.

FIGS. 8 and 9 show longitudinal sections through the holder 2 according to the dashed lines VIII and IX in FIG. 7. In particular, FIG. 8 shows the edge 50 that is engaged by the catch 36 depicted with dashed lines. In a preferred exemplary embodiment, the edge 50 can be beveled on a side oriented toward the leaf spring 48 that contacts it during the engagement.

FIG. 9 shows a longitudinal section through the holder 2 in the region of the mating connector 76. The mating connector 76 is preferably mounted to the plate 70 by means of screws that are not shown in FIG. 9. At the edges, the plate 70 is bent toward the support 3. Preferably, a bridge piece 78 separates the hollow 77 from the fourth recess 74.

The first hook 41 is depicted with dashed lines and, after insertion into the second recess 72, rests against a support surface 80 of the plate 70 on the side of the plate 70 oriented away from the cover plate 31. The support surface 80 is provided with a pin 81, which engages in the first hole 43 of the first hook 41. In order to unhook the monitor 1 from the holder, the first hook 41 must be lifted past the pin 81, thus preventing the monitor from falling out of the holder 2 after the pivoting ratchet 35 is released. This constitutes an additional protective measure. In a preferred embodiment, the first hook can be pivoted slightly around the pin 81 so that after the first hook 41 is hooked onto the support surface 80, it can still be pivoted, thus permitting the plug 40 and the mating connector 76 to be connected.

The invention claimed is:

1. An electrical device for attachment to a holder in a vehicle, wherein the electrical device (1) is attached to the holder (2) in a first connection by means of at least one hook (41, 42), wherein the electrical device (1) can pivot in relation to the holder (2) because the at least one hook (41, 42) can pivot in relation to the holder (2, 71, 72), and wherein the electrical device (1) can be looked to the holder (2) in a second connection (36, 50), wherein the at least one hook (41, 42) is provided on the electrical device (1, 31), wherein a receptacle (71, 72, 81) for the at least one hook (41, 42) is embodied on the holder (2), wherein a pin (81) is provided on the receptacle (71, 72), wherein a hole (43, 44) for accommodating the pin (81) is provided in the hook (41, 42), and wherein the pin (81) secures the hook (41, 42) in the receptacle (71, 72).

2. The electrical device according to claim 1, wherein a top (31) of the electrical device (1) can be attached to an underside (70) of the holder (2).

3. The electrical device according to claim 1, wherein the electrical device (1) can be locked to the holder (2) by means of a pivoting catch (36).

4. The electrical device according to claim 3, wherein the catch (36) engages an edge (50) of the holder (2).

5. The electrical device according to claim 1, wherein the pivoting catch (36) is disposed on a pivoting ratchet (35).

6. The electrical device as defined in claim 5, wherein the pivoting catch (36) is pivotably provided on the electrical device.

7. The electrical device as defined in claim 5, wherein the pivoting ratchet (35) is securable by means of lock (37).

8. The electrical device according to claim 1, wherein the electrical device is provided with a detent mechanism that automatically engages with the holder (2) in detent fashion when the electrical device is pivoted against the holder.

9. The electrical device according to claim 1, wherein the locking (35, 36, 50) of the electrical device to the holder (2) is secured by means of a lock (6, 37).

10. The electrical device according to claim 1, wherein the electrical device (1) has at least one housing (30) and an electrical component (9), that the electrical component (9) is fastened inside the housing (30), and that the at least one hook (41, 42) is provided on the housing (30).

11. The electrical device according to claim 1, wherein the housing (30) of the electrical device (1) is at least partially covered with a protective layer (47) made of a plastic material.

12. The electrical device according to claim 1, wherein a plug connection (40) is provided on a side of the electrical device (1) oriented toward the holder (2).

13. The electrical device according to claim 1, wherein the electrical device (1) has at least one display unit (9), preferably a cathode ray tube display.

14. The electrical device as defined in claim 13 wherein the at least one display unit (9) in a cathode ray tube display.

15. An electrical device for attachment to a holder in a vehicle, wherein the electrical device (1) is attached to the holder (2) in a first connection by means of at least one hook (41, 42), wherein the electrical device (1) can pivot in relation to the holder (2) because the at least one hook (41, 42) can pivot in relation to the holder (2, 71, 72), wherein the electrical device (1) can be looked to the holder (2) in a second connection (36, 50), wherein the electrical device (1) has at least one display unit (9), wherein the at least one display unit (9) is a cathode ray tube display.

16. The electrical device according to claim 15, wherein the at least one hook (41, 42) is provided on the electrical deviCe (1, 31) and that a receptacle (71, 72, 81) for the at least one hook (41, 42) is embodied on the holder (2).

17. The electrical device according to claim 16, wherein a pin (81) is provided on the receptacle (71, 72), that a hole (43, 44) for accommodating the pin (81) is provided in the hook (41, 42), and that the pin (81) secures the hook (41, 42) in the receptacle (71, 72).

18. The electrical device according to claim 15, wherein a top (31) of the electrical device (1) can be attached to an underside (70) of the holder (2).

19. The electrical device according to claim 15, wherein the electrical device (1) can be locked to the holder (2) by means of a pivoting catch (36).

20. The electrical device according to claim 19, wherein the catch (36) engages an edge (50) of the holder (2).

21. The electrical device according to claim 15, wherein the pivoting catch (36) is disposed on a pivoting ratchet (35).

22. The electrical device as defined in claim 21, wherein the pivoting catch (36) is pivotably provided on the electrical device.

23. The electrical device as defined in claim 21, wherein the pivoting ratchet (35) is securable by means of lock (37).

24. The electrical device according to claim 15, wherein the electrical device is provided with a detent mechanism that automatically engages with the holder (2) in detent fashion when the electrical device is pivoted against the holder.

25. The electrical device according to claim 15, wherein the locking (35, 36, 50) of the electrical device to the holder (2) is secured by means of a lock (6, 37).

26. The electrical device according to claim 15, wherein the electrical device (1) has at least one housing (30) and an electrical component (9), that the electrical component (9) is fastened inside the housing (30), and that the at least one hook (41, 42) is provided on the housing (30).

27. The electrical device according to claim 15, wherein the housing (30) of the electrical device (1) is at least partially covered with a protective layer (47) made of a plastic material.

28. The electrical device according to claim 15, wherein a plug connection (40) is provided on a side of the electrical device (1) oriented toward the holder (2).

29. An electrical device for attachment to a holder in a vehicle, wherein the electrical device (1) is attached to the holder (2) in a first connection by means of at least one hook (41, 42), wherein the electrical device (1) can pivot in relation to the holder (2) because the at least one hook (41, 42) can pivot in relation to the holder (2, 71, 72), and wherein the electrical device (1) can be locked to the holder (2) in a second connection (36, 50), wherein the electrical device (1) can be locked to the holder (2) by means of a pivoting catch (36), wherein the pivoting catch (36) is disposed on a pivoting ratchet (35), wherein the electrical device Is provided with a detent mechanism that automatically engages with the holder (2) in detent fashion when the electrical device is pivoted against the holder, wherein the pivoting ratchet (35) is prevented from moving by means of a securing catch (61), and wherein an axle (62) of the securing catch (61) is connected to a closing cylinder of a lock (37).

\* \* \* \* \*